United States Patent
Weinstein et al.

(10) Patent No.: US 9,383,241 B2
(45) Date of Patent: *Jul. 5, 2016

(54) METHOD AND APPARATUS FOR DETERMINING DIFFERENTIAL FLOW CHARACTERISTICS OF A MULTIPLE METER FLUID FLOW SYSTEM

(75) Inventors: Joel Weinstein, Boulder, CO (US); Paul J. Hays, Lafayette, CO (US)

(73) Assignee: Micro Motion, Inc., Boulder, CO (US)

( * ) Notice: Subject to any disclaimer, the term of this patent is extended or adjusted under 35 U.S.C. 154(b) by 347 days.

This patent is subject to a terminal disclaimer.

(21) Appl. No.: 14/126,569

(22) PCT Filed: Jul. 7, 2011

(86) PCT No.: PCT/US2011/043132
§ 371 (c)(1),
(2), (4) Date: Dec. 16, 2013

(87) PCT Pub. No.: WO2013/006171
PCT Pub. Date: Jan. 10, 2013

(65) Prior Publication Data
US 2014/0123727 A1    May 8, 2014

(51) Int. Cl.
*G01F 1/84*    (2006.01)
*G01F 25/00*    (2006.01)

(52) U.S. Cl.
CPC ............... *G01F 1/84* (2013.01); *G01F 1/8436* (2013.01); *G01F 1/8477* (2013.01); *G01F 25/0007* (2013.01)

(58) Field of Classification Search
CPC ..................................................... G01F 25/00
USPC ................................................. 73/1.31, 1.16
See application file for complete search history.

(56) References Cited

U.S. PATENT DOCUMENTS

2004/0200259 A1    10/2004    Mattar
2005/0119845 A1    6/2005    Lesjak

FOREIGN PATENT DOCUMENTS

| JP | 08271307 A | 10/1996 |
|---|---|---|
| WO | 2006022742 A1 | 3/2006 |
| WO | 2011019344 A2 | 2/2011 |
| WO | 2011019345 A1 | 2/2011 |

OTHER PUBLICATIONS

U.S. Appl. No. 14/116,472.*

* cited by examiner

*Primary Examiner* — Jewel V Thompson
(74) *Attorney, Agent, or Firm* — The Ollila Law Group LLC (57) ABSTRACT

A fluid flow system (300) is provided. The fluid flow system (300) includes a pipeline (302) with a flowing fluid. The fluid flow system (300) further includes a first vibrating meter (5) including a first sensor assembly (10) located within the pipeline (302) and configured to determine one or more flow characteristics, including a first flow rate. A second vibrating meter (5') including a second sensor assembly (10') located within the pipeline (302) is provided that is in fluid communication with the first sensor assembly (10) and configured to determine one or more flow characteristics, including a second flow rate. The fluid flow system (300) further includes a system controller (310) in electrical communication with the first and second vibrating meters (5, 5'). The system controller (310) is configured to receive the first and second flow rates and determine a differential flow rate based on the first and second flow rates. The system controller (310) is further configured to compare the differential flow rate to a threshold value or band and correct one or more flow characteristics if the differential flow rate is less than a threshold value or band.

18 Claims, 7 Drawing Sheets

METHOD AND APPARATUS FOR DETERMINING DIFFERENTIAL FLOW CHARACTERISTICS OF A MULTIPLE METER FLUID FLOW SYSTEM

TECHNICAL FIELD

The embodiments described below relate to, vibrating meters, and more particularly, to a method and apparatus for determining differential flow characteristics of a fluid flow system with multiple vibrating meters.

BACKGROUND OF THE INVENTION

Vibrating sensors, such as for example, vibrating densitometers and Coriolis flow meters are generally known and are used to measure mass flow and other information for materials flowing through a conduit in the flow meter. Exemplary Coriolis flow meters are disclosed in U.S. Pat. No. 4,109,524, U.S. Pat. No. 4,491,025, and Re. 31,450 all to J. E. Smith et al. These flow meters have one or more conduits of straight or curved configuration. Each conduit configuration in a Coriolis mass flow meter has a set of natural vibration modes, which may be of simple bending, torsional, or coupled type. Each conduit can be driven to oscillate at a preferred mode.

Material flows into the flow meter from a connected pipeline on the inlet side of the flow meter, is directed through the conduit(s), and exits the flow meter through the outlet side of the flow meter. The natural vibration modes of the vibrating, material filled system are defined in part by the combined mass of the conduits and the material flowing within the conduits.

When there is no flow through the flow meter, a driving force applied to the conduit(s) causes all points along the conduit(s) to oscillate with identical phase or a small "zero offset", which is a time delay measured at zero flow. As material begins to flow through the flow meter, Coriolis forces cause each point along the conduit(s) to have a different phase. For example, the phase at the inlet end of the flow meter lags the phase at the centralized driver position, while the phase at the outlet leads the phase at the centralized driver position. Pick-off sensors on the conduit(s) produce sinusoidal signals representative of the motion of the conduit(s). Signals output from the pick-off sensors are processed to determine the time delay between the pick-off sensors. The time delay between the two or more pick-off sensors is proportional to the mass flow rate of material flowing through the conduit(s).

Meter electronics connected to the driver generates a drive signal to operate the driver and determines a mass flow rate and other properties of a material from signals received from the pick-off sensors. The driver may comprise one of many well-known arrangements; however, a magnet and an opposing drive coil have received great success in the flow meter industry. An alternating current is passed to the drive coil for vibrating the conduit(s) at a desired flow tube amplitude and frequency. It is also known in the art to provide the pick-off sensors as a magnet and coil arrangement very similar to the driver arrangement. However, while the driver receives a current which induces a motion, the pick-off sensors can use the motion provided by the driver to induce a voltage. The magnitude of the time delay measured by the pick-off sensors is very small; often measured in nanoseconds. Therefore, it is necessary to have the transducer output be very accurate.

Generally, a Coriolis flow meter can be initially calibrated and a flow calibration factor along with a zero offset can be generated. In use, the flow calibration factor can be multiplied by the time delay measured by the pick-off sensors minus the zero offset to generate a mass flow rate. In most situations, the Coriolis flow meter is initially calibrated, typically by the manufacturer, and assumed to provide accurate measurements without subsequent calibrations required. In addition, a prior art approach involves a user zero calibrating the flow meter after installation by stopping flow, closing valves, and therefore providing the meter a zero flow rate reference at process conditions.

As mentioned above, in many vibrating sensors, including Coriolis flow meters, a zero offset may be present, which prior art approaches initially correct for. Although this initially determined zero offset can adequately correct the measurements in limited circumstances, the zero offset may change over time due to a change in a variety of operating conditions, mainly temperature, resulting in only partial corrections. However, other operating conditions may also affect the zero offset, including pressure, fluid density, sensor mounting conditions, etc. Furthermore, the zero offset may change at a different rate from one meter to another. This may be of particular interest in situations where more than one meter is connected in series such that each of the meters should read the same if the same fluid flow is being measured. Examples of such situations involve fuel consumption and leak detection applications.

It is known to determine a differential zero offset to configure the two meters to read substantially the same flow rate when the flow rate flowing through the meters is substantially equal as taught by International Publication WO/2011/019344, which is assigned to the present applicants and is hereby incorporated by reference for all that it teaches. However, there still exists a need for improving the differential measurement obtained from a multiple sensor system. The embodiments described below overcome this and other problems and an advance in the art is achieved. The embodiments described below improve upon a differential flow measurement obtained from two or more vibrating meters by incorporating a low differential flow cutoff that corrects the determined differential flow along with other flow characteristics if the determined differential flow is below a threshold value or band.

SUMMARY OF THE INVENTION

A fluid flow system is provided according to an embodiment. The fluid flow system includes a pipeline with a flowing fluid and a first vibrating meter including a first sensor assembly located within the pipeline and configured to determine one or more flow characteristics, including a first flow rate. According to an embodiment, the fluid flow system further includes a second vibrating meter including a second sensor assembly located within the pipeline and in fluid communication with the first sensor assembly and configured to determine one or more flow characteristics, including a second flow rate. According to an embodiment, the fluid flow system further comprises a system controller in electrical communication with at least one of the first or second vibrating meters. The system controller is configured to receive the first and second flow rates and determine a differential flow rate based on the first and second flow rates. According to an embodiment, the system controller is further configured to compare the differential flow rate to a threshold value or band and correct one or more flow characteristics if the differential flow rate is less than a threshold value or band.

A meter electronics for a first sensor assembly located within a pipeline and in fluid communication with a second sensor assembly of a vibrating meter in electrical communication with the meter electronics is provided according to an embodiment. The meter electronics is configured to receive sensor signals from the first sensor assembly and determine one or more flow characteristics, including a first fluid flow rate. According to an embodiment, the meter electronics is further configured to receive a second fluid flow rate from the second vibrating meter and determine a differential flow rate based on the first and second fluid flow rates. According to an embodiment, the meter electronics is further configured to compare the differential flow rate to a threshold value or band and correct one or more flow characteristics if the differential flow rate is less than the threshold value or band.

A method of operating a fluid flow system including a first vibrating meter and a second vibrating meter in fluid communication with the first vibrating meter is provided according to an embodiment. The method comprises a step of receiving first sensor signals from the first vibrating meter and receiving second sensor signals from the second vibrating meter. According to an embodiment, the method further comprises steps of determining one or more flow characteristics, including first and second flow rates based on the first and second sensor signals and determining a differential flow rate based on the first and second flow rates. According to an embodiment, the method further comprises steps of comparing the differential flow rate to a threshold value or band and correcting the one or more flow characteristics if the differential flow rate is less than the threshold value or band.

ASPECTS

According to as aspect, a fluid flow system comprises:
a pipeline with a flowing fluid;
a first vibrating meter including a first sensor assembly located within the pipeline and configured to determine one or more flow characteristics, including a first flow rate;
a second vibrating meter including a second sensor assembly located within the pipeline and in fluid communication with the first sensor assembly and configured to determine one or more flow characteristics, including a second flow rate;
a system controller in electrical communication with the first and second vibrating meters and configured to:
  receive the first and second flow rates;
  determine a differential flow rate based on the first and second flow rates;
  compare the differential flow rate to a threshold value or band; and
  correct one or more flow characteristics if the differential flow rate is less than a threshold value or band.

Preferably, the correction comprises setting the differential flow rate to zero.

Preferably, one of the first or second flow rates is determined using a differential zero offset.

Preferably, the system controller is further configured to determine a new differential zero offset if the differential flow rate is less than the threshold value.

Preferably, the system controller is further configured to determine a new differential zero offset if the differential flow rate is less than the threshold value for a predetermined amount of time.

Preferably, the system controller is further configured to apply a group delay to one of the first or second flow rates such that the first and second flow rates are representative of flow rates occurring at substantially the same time.

According to another aspect, a meter electronics for a first sensor assembly located within a pipeline and in fluid communication with a second sensor assembly of a vibrating meter in electrical communication with the meter electronics is configured to:
  receive sensor signals from the first sensor assembly and determine one or more flow characteristics, including a first fluid flow rate;
  receive a second fluid flow rate from the second vibrating meter;
  determine a differential flow rate based on the first and second fluid flow rates;
  compare the differential flow rate to a threshold value or band; and
  correct one or more flow characteristics if the differential flow rate is less than the threshold value or band.

Preferably, the correction comprises setting the differential flow rate to zero.

Preferably, the meter electronics is further configured to determine the first fluid flow rate using a differential zero offset.

Preferably, the meter electronics is further configured to determine a new differential zero offset if the differential flow rate is less than the threshold value or band.

Preferably, the meter electronics is further configured to determine a new differential zero offset if the differential flow rate is less than the threshold value or band for a predetermined amount of time.

Preferably, the meter electronics is further configured to determine the differential flow rate using a group delay applied to the first flow rate such that the first and second flow rates are representative of flow rates occurring at substantially the same time.

According to another aspect, a method of operating a fluid flow system including a first vibrating meter and a second vibrating meter in fluid communication with the first vibrating meter comprises steps of:
  receiving first sensor signals from the first vibrating meter and receiving second sensor signals from the second vibrating meter;
  determining one or more flow characteristics, including first and second flow rates based on the first and second sensor signals;
  determining a differential flow rate based on the first and second flow rates;
  comparing the differential flow rate to a threshold value or band; and
  correcting the one or more flow characteristics if the differential flow rate is less than the threshold value or band.

Preferably, the correction comprises setting the differential flow rate to zero.

Preferably, one of the first or second flow rates is determined using a differential zero offset.

Preferably, the method further comprises a step of determining a new differential zero offset if the differential flow rate is less than the threshold value or band.

Preferably, the method further comprises a step of determining a new differential zero offset if the differential flow rate is less than the threshold value or band for a predetermined amount of time.

Preferably, the step of determining the differential flow rate comprises applying a group delay to one of the first or second flow rates such that the first and second flow rates are representative of flow rates occurring at substantially the same time.

DETAILED DESCRIPTION OF THE INVENTION

FIGS. 1-7 and the following description depict specific examples to teach those skilled in the art how to make and use the best mode of embodiments of a vibrating meter system. For the purpose of teaching inventive principles, some conventional aspects have been simplified or omitted. Those skilled in the art will appreciate variations from these examples that fall within the scope of the present description. Those skilled in the art will appreciate that the features described below can be combined in various ways to form multiple variations of the vibrating meter system. As a result, the embodiments described below are not limited to the specific examples described below, but only by the claims and their equivalents.

Figure 1:
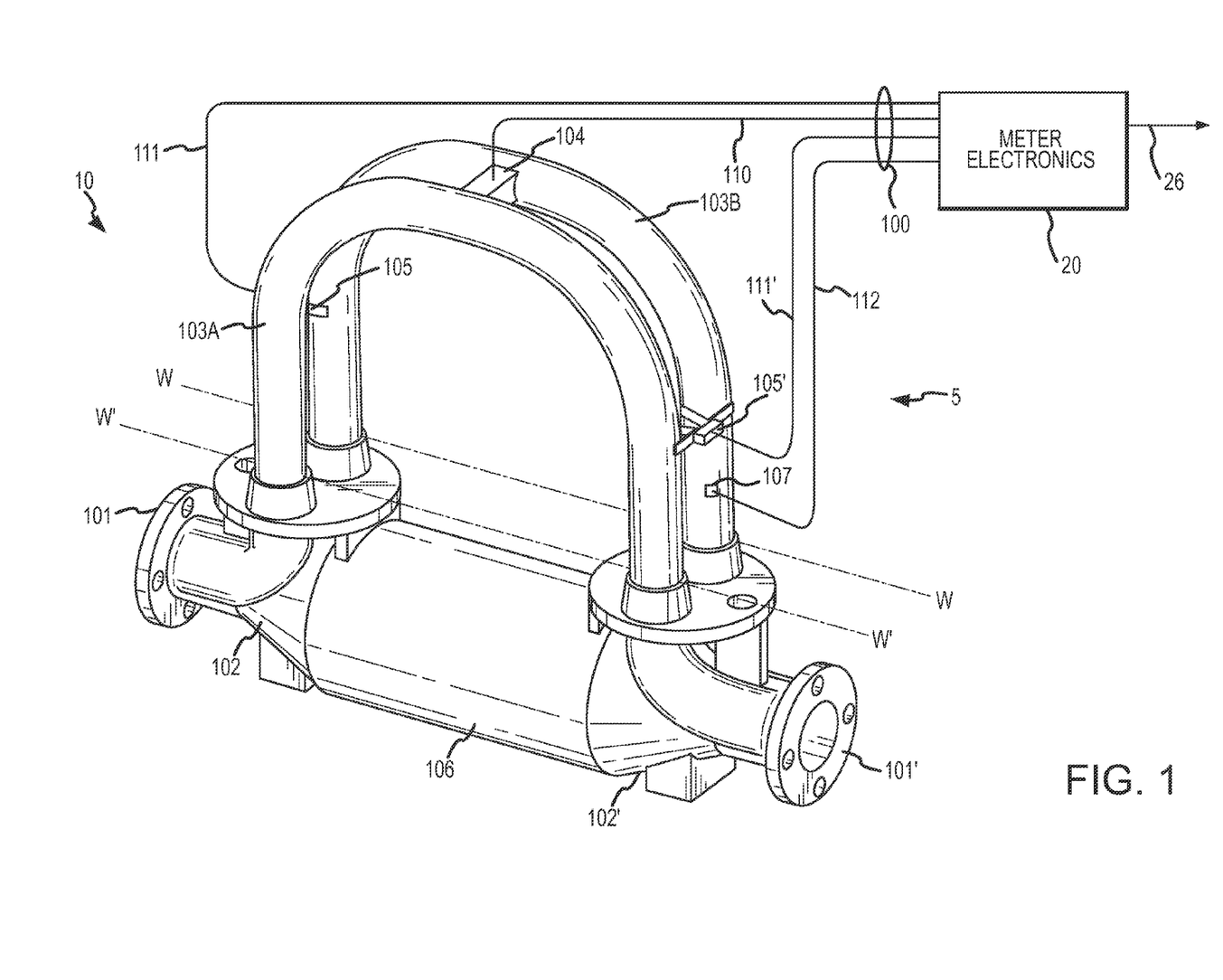
FIG. 1 shows a vibrating meter according to an embodiment.

FIG. 1 shows an example of a vibrating meter 5 in the form of a Coriolis flow meter comprising a sensor assembly 10 and one or more meter electronics 20. The meter electronics 20 is connected to the sensor assembly 10 via leads 100 to measure one or more flow characteristics of a material, such as, for example, density, mass flow rate, volume flow rate, totalized mass flow, temperature, and other information.

The sensor assembly 10 includes a pair of flanges 101 and 101', manifolds 102 and 102', and conduits 103A and 103B. Manifolds 102, 102' are affixed to opposing ends of conduits 103A, 103B. Flanges 101 and 101' of the present embodiment are affixed to manifolds 102 and 102'. Manifolds 102 and 102' of the present embodiment are affixed to opposite ends of spacer 106. The spacer 106 maintains the spacing between manifolds 102 and 102' in the present embodiment to prevent undesired vibrations in conduits 103A and 103B. The conduits 103A and 103B extend outwardly from the manifolds in an essentially parallel fashion. When the sensor assembly 10 is inserted into a pipeline system (See FIG. 3) which carries a flowing material, the material enters the sensor assembly 10 through flange 101, passes through inlet manifold 102 where the total amount of material is directed to enter conduits 103A and 103B, flows through conduits 103A and 103B and back into outlet manifold 102' where it exits the sensor assembly 10 through the flange 101'.

The sensor assembly 10 includes a driver 104. The driver 104 is affixed to conduits 103A and 103B in a position where the driver can vibrate the conduits 103A, 103B in the drive mode. More particularly, the driver 104 includes a first driver component (not shown) affixed to conduit 103A and a second driver component (not shown) affixed to conduit 103B. The driver 104 may comprise one of many well-known arrangements, such as a magnet mounted to the conduit 103A and an opposing coil mounted to the conduit 103B.

In the present example, the drive mode is the first out of phase bending mode and the conduits 103A, 103B are preferably selected and appropriately mounted to inlet manifold 102 and outlet manifold 102' so as to provide a balanced system having substantially the same mass distribution, moments of inertia, and elastic modules about bending axes W-W and W'-W', respectively. In the present example, where the drive mode is the first out of phase bending mode, the conduits 103A, 103B are driven by the driver 104 in opposite directions about their respective bending axes W-W and W'-W'. A drive signal in the form of an alternating current can be provided by the meter electronics 20, such as for example, via pathway 110, and passed through the coil to cause both conduits 103A, 103B to oscillate. Those of ordinary skill in the art will appreciate that other drive modes may be used within the scope of the present embodiment.

The sensor assembly 10 also includes a pair of pick-off sensors 105, 105' that are affixed to conduits 103A, 103B. More particularly, a first pick-off component (not shown) is located on the conduit 103A and a second pick-off component (not shown) is located on the conduit 103B. In the embodiment depicted, the pick-off sensors 105, 105' may be electromagnetic detectors, for example, pick-off magnets and pick-off coils that produce pick-off signals that represent the velocity and position of the conduits 103A, 103B. For example, the pick-off sensors 105, 105' may supply pick-off signals to the meter electronics 20 via pathways 111, 111'. Those of ordinary skill in the art will appreciate that the motion of the conduits 103A, 103B is proportional to certain flow characteristics of the material, for example, the mass flow rate, density, volume flow rate, etc. flowing through the conduits 103A, 103B.

It should be appreciated that while the sensor assembly 10 is described above as comprising a dual flow conduit sensor assembly, it is well within the scope of the present embodiment to implement a single conduit sensor assembly. Furthermore, while the flow conduits 103A, 103B are shown as comprising a curved flow conduit configuration, the present embodiment may be implemented with a sensor assembly comprising a straight flow conduit configuration. Therefore, the particular embodiment of the sensor assembly 10 described above is merely one example, and should in no way limit the scope of the present embodiment.

In the embodiment shown in FIG. 1, the meter electronics 20 receives the pick-off signals from the pick-off sensors 105, 105'. Path 26 provides an input and an output means that allows the meter electronics 20 to interface with an operator or another meter electronics (See FIG. 3). The meter electronics 20 measures one or more characteristics of the system, such as, a phase difference, a frequency, a time delay, a density, a mass flow rate, a volume flow rate, a totalized mass flow, a temperature, a meter verification, and other information. More particularly, the meter electronics 20 can receive one or more signals from the pick-off sensors 105, 105' and one or more temperature sensors (not shown), and uses this information to measure the various characteristics of the material.

The sensor assembly 10 can additionally include a temperature sensor 107, such as a resistance temperature device (RTD), in order to measure a temperature of the fluid within the conduits 103A, 103B. The RTD can be in electrical communication with the meter electronics 20 via lead 112.

The techniques by which vibrating meters, such as for example, Coriolis flow meters or densitometers measure flow characteristics are well understood; therefore, a detailed discussion is omitted for brevity of this description.

As discussed briefly above, one problem associated with vibrating meters, such as Coriolis flow meters is the presence of a zero offset, which is a measured time delay of the pick-off sensors 105, 105' at zero fluid flow. If the zero offset is not taken into account in calculating the flow rate and various other flow characteristics, the measured flow characteristics will typically include an error in the measurement. The typical prior art approach to compensate for the zero offset is to measure an initial zero offset ($\Delta t_0$) during an initial calibration process, which usually involves closing valves and providing a zero flow reference condition. Such calibration processes are generally known in the art and a detailed discussion is omitted for brevity of the description. Once an initial zero offset is determined, during operation, flow measurements are corrected by subtracting the initial zero offset from the measured time delay according to equation (1).

$$\dot{m} = FCF(\Delta t_{measured} - \Delta t_0) \quad (1)$$

Where:
$\dot{m}$=mass flow rate;
FCF=Flow calibration factor;
$\Delta t_{measured}$
$\Delta t_{measured}$=measured time delay; and
$\Delta t_0$=initial zero offset.

It should be appreciated that equation (1) is merely provided as an example and should in no way limit the scope of the present embodiment. Although equation (1) is provided to calculate mass flow rate, it should be appreciated that various other flow measurements may be affected by the zero offset and therefore, may also be corrected.

While this approach can provide adequate results in a single sensor assembly system, there are some situations where multiple sensor assemblies are incorporated in series. For example, as explained in the above-mentioned International Publication WO/2011/019344, some situations are more concerned with a difference between two measured flow rates determined by two or more sensor assemblies (differential flow rate) than an absolute flow rate as determined by any one individual sensor assembly. In such situations, one vibrating meter can comprise a reference meter with the other vibrating meter being calibrated to provide a substantially equal mass flow rate when the flow through the two meters is equal.

Because the two meters are configured to produce equal measurements under equal conditions, the absolute zero offset of the meters is not as important as in a single meter system. Therefore, according to an embodiment, the meter electronics 20 or more than one meter electronics can be configured to generate a differential zero offset between the two or more sensor assemblies. The differential zero offset can comprise an initial zero offset of a sensor assembly combined with a differential error between two or more sensor assemblies. The differential zero offset may be required in order to generate substantially equal flow rates through the sensor being calibrated and a reference sensor. In other words, referring to equation (1) above, if the same fluid flow rate flows through the sensor being calibrated and a reference sensor, the two sensors can generate two mass flow rates using equation (1) for each sensor. If the reference sensor's mass flow rate is assumed to be equal to the mass flow rate of the sensor assembly being calibrated, then the differential zero offset of the sensor being calibrated can be calculated. This new offset is essentially a differential offset and is shown in equations (2 and 3).

$$\dot{m}_R = \dot{m}_C = FCF_C[\Delta t_C - (\Delta t_{0c} + \Delta t_E)] \quad (2)$$

$$(\Delta t_{0c} + \Delta t_E) = \Delta t_C - \frac{\dot{m}_R}{FCF_C} \quad (3)$$

Where:
$\dot{m}_R$=mass flow rate calculated from reference sensor;
$\dot{m}_C$=mass flow rate calculated from sensor being calibrated;
$\Delta t_{0c}$=initial zero offset of the sensor being calibrated;
$\Delta t_E$=differential error;
$\Delta t_C$=measured time delay of the sensor being calibrated; and
$FCF_C$=flow calibration factor of the sensor being calibrated.

Equation (3) can be further reduced by combining the zero offset of the sensor being calibrated and the differential error. The result is an equation that defines the differential zero offset, which is shown in equation (4).

$$\Delta t_D = \Delta t_C - \frac{\dot{m}_R}{FCF_C} \quad (4)$$

Where:
$\Delta t_D$=differential zero offset.

Therefore, as explained in '344 publication, the differential zero offset can account for a difference in measured flow characteristics between two or more sensor assemblies that are measuring substantially the same flow. When the differential zero offset used in the calibrated sensor rather than the initial zero offset to solve equation (1), the differential measurement performance of a sensor pair can be greatly improved. The differential zero offset can be stored in the meter electronics 20, for example.

Figure 2:
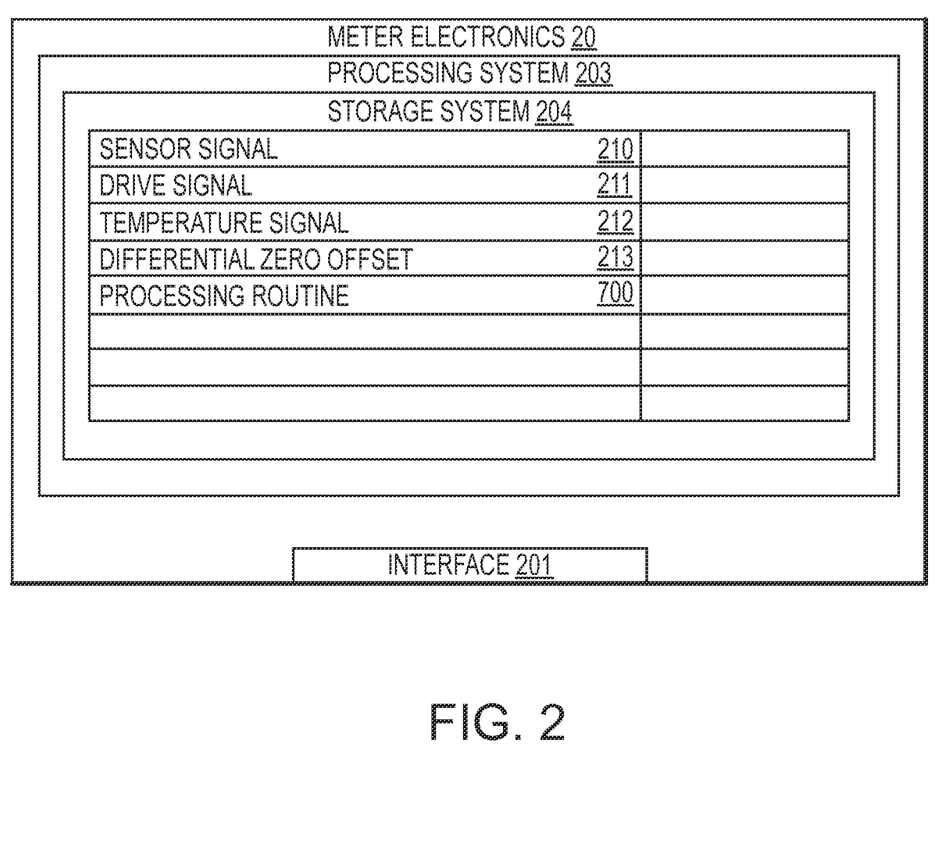
FIG. 2 shows a meter electronics for a vibrating meter according to an embodiment.

FIG. 2 shows the meter electronics 20 according to an embodiment. The meter electronics 20 can include an interface 201 and a processing system 203. The processing system 203 may include a storage system 204. The storage system 204 may comprise an internal memory as shown, or alternatively, may comprise an external memory. The meter electronics 20 can generate a drive signal 211 and supply the drive signal 211 to the driver 104. In addition, the meter electronics 20 can receive sensor signals 210 from the flow meter 10 and/or the sensor assembly 10' shown below, such as pick-off sensor signals. In some embodiments, the sensor signals 210 can be received from the driver 104. The meter electronics 20 can operate as a densitometer or can operate as a mass flow meter, including operating as a Coriolis mass flow meter. It should be appreciated that the meter electronics 20 may also operate as some other type of vibrating meter and the particular examples provided should not limit the scope of the present embodiment. The meter electronics 20 can process the sensor signals 210 in order to generate one or more flow characteristics of the material flowing through the conduits 103A, 103B. The one or more flow characteristics may be generated using a stored differential zero offset 213. In some embodiments, the meter electronics 20 may receive a temperature signal 212 from one or more resistance temperature device (RTD) sensors or other temperature measuring devices, for example.

The interface 201 can receive the sensor signals 210 from the driver 104 or pick-off sensors 105, 105', via leads 110, 111, 111'. The interface 201 may perform any necessary or desired signal conditioning, such as any manner of formatting, amplification, buffering, etc. Alternatively, some or all of the signal conditioning can be performed in the processing system 203. In addition, the interface 201 can enable communications between the meter electronics 20 and external devices. The interface 201 can be capable of any manner of electronics, optical, or wireless communication.

The interface 201 in one embodiment can include a digitizer (not shown), wherein the sensor signals comprise analog sensor signals. The digitizer can sample and digitize the analog sensor signals and produce digital sensor signals. The digitizer can also perform any needed decimation, wherein the digital sensor signal is decimated in order to reduce the amount of signal processing needed and to reduce the processing time.

The processing system 203 can conduct operations of the meter electronics 20 and process flow measurements from the flow meter 10. The processing system 203 can execute one or more processing routines, such as the differential offset determination routine 213, and thereby process the flow measurements in order to produce one or more flow characteristics that are compensated for a drift in the zero offset of the sensor.

The processing system 203 can comprise a general purpose computer, a micro-processing system, a logic circuit, or some other general purpose or customized processing device. The processing system 203 can be distributed among multiple processing devices. The processing system 203 can include any manner of integral or independent electronic storage medium, such as the storage system 204.

It should be understood that the meter electronics 20 may include various other components and functions that are generally known in the art. Those additional features are omitted from the description and the figures for the purposes of brevity. Therefore, the present embodiment should not be limited to the specific configuration shown and discussed.

Although the above-mentioned vibrating meter can be implemented as a single vibrating meter system, there are many applications that utilize multiple vibrating meters in series. In many of these applications, the absolute flow rate measured by each individual sensor assembly is not of particular interest, but rather the difference between the flow rates measured by the various sensor assemblies, i.e., the differential flow rate, is primary flow characteristic of interest to the user or operator. Two common examples of such a situation are in the application of fuel consumption measurements and leak detections measurements. A fuel consumption application is shown in FIG. 3; however, the figure is equally applicable to other situations, such as leak detection systems, where multiple sensor assemblies are implemented in series and the difference in measurements between at least two sensor assemblies is of interest.

Figure 3:
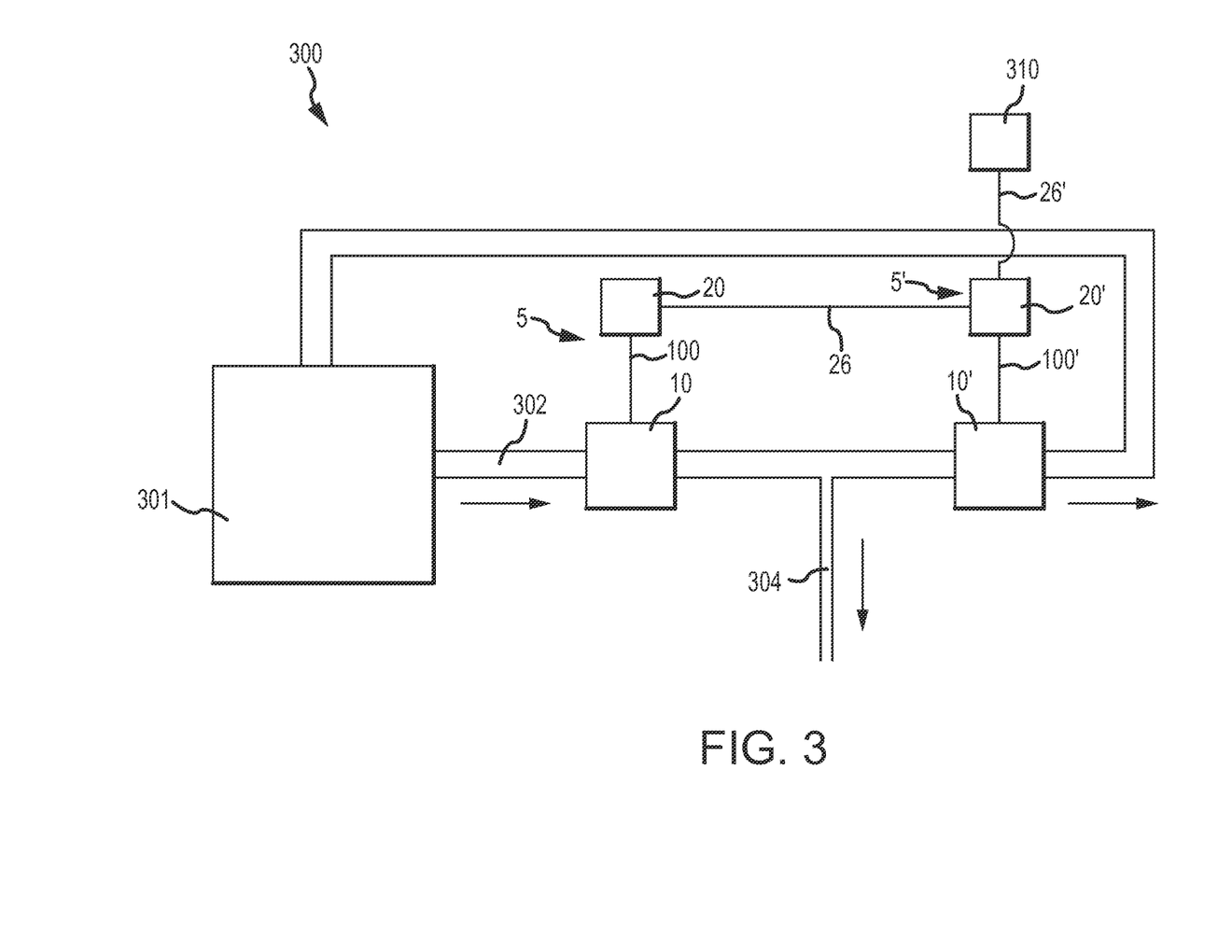
FIG. 3 shows a fluid flow system according to an embodiment.

FIG. 3 shows a block diagram of a fluid flow system 300 according to an embodiment, Although the fluid flow system 300 is shown as a typical fuel consumption system, it should be appreciated that fuel is merely one example fluid and the fluid flow system 300 is equally applicable to other fluids, Therefore, the use of fuel should not limit the scope of the present embodiment.

The fluid flow system 300 includes a fuel supply 301, a pipeline 302, a first sensor assembly 10 positioned in the pipeline 302, a fuel outlet 304, and a second sensor assembly 10' positioned in the pipeline 302. The pipeline 302 therefore provides a fluid communication path between the first and second sensor assemblies 10, 10'. The second sensor assembly 10' may comprise a similar sensor assembly as the first sensor assembly 10 as shown in FIG. 1. Typically, an engine or other fuel consuming device would be positioned between the first and second sensor assemblies 10, 10' in the fuel outlet 304; however, the device has been omitted from the figure to reduce the complexity of the drawing.

Further shown in FIG. 3, are first and second meter electronics 20, 20' in electrical communication with the corresponding sensor assemblies 10, 10' via leads 100, 100'. Additionally, the first meter electronics 20 is in electrical communication with the second meter electronics 20' via lead 26. Therefore, the second meter electronics 20' can receive sensor signals from both sensor assemblies 10, 10'. Alternatively, the first meter electronics 20 can process the sensor signals from the first sensor assembly 10 and provide the measured flow characteristics to the second meter electronics 20'. The second meter electronics 20' is shown in electrical communication with a system controller 310 via lead 26'. The system controller 310 can output information to a host system (not shown). The system controller 310 therefore, may comprise a centralized processing system, a general-purpose computer, or some other type of general or customized processing device that can process signals received from both of the meter electronics 20, 20'. Therefore, the system controller 310 may not comprise a portion of the vibrating meters 5, 5', but rather, may be configured to process signals from the vibrating meters 5, 5'. The system controller 310 can also be in electrical communication with a user interface (not shown). This may allow a user to configure the system controller 310 according to the user's preference or requirements.

In other embodiments, both sensor assemblies 10, 10' may be coupled directly to the same meter electronics. Alternatively, both meter electronics 20, 20' may be coupled to the system controller 310. According to an embodiment, the first and second vibrating meters 5, 5' comprise Coriolis flow meters. However, the vibrating meters may comprise other types of vibrating sensors that lack the measurement capabilities of Coriolis flow meters. Therefore, the present embodiment should not be limited to Coriolis flow meters.

In use, a fluid, such as fuel, can be supplied to the first sensor assembly 10 via the pipeline 302. The first vibrating sensor 5 can calculate various flow characteristics, including a first fluid flow rate, as discussed above. The fuel then exits the first sensor assembly 10 and flows towards the fuel consuming device and to either the fuel outlet 304 or the second vibrating meter 5'. If fuel is being drawn from the fuel outlet 304, such as for example, if an engine is running and consuming fuel, then only a portion of the fuel exiting the first sensor assembly 10 will flow to the second sensor assembly 10' as the engine does not burn all of the fuel supplied. The second vibrating meter 5' can calculate various flow characteristics including a second fluid flow rate. If the engine is running and consuming fuel, the first and second flow rates measured by the first and second vibrating meters 5, 5' will be different resulting in a differential flow rate as defined by equation (5).

$$\dot{m}_5 - \dot{m}_{5'} = \Delta\dot{m} \qquad (5)$$

Where:

$\dot{m}_5$ is the mass flow rate measured by the first vibrating meter 5;

$\dot{m}_{5'}$ f is the mass flow rate measured by the second vibrating meter 5'; and $\Delta\dot{m}$ is the differential flow rate.

Although equation (5) is provided in terms of a mass flow rate, those skilled in the art will readily recognize how a similar equation can be developed for a volume flow rate. The differential flow rate is essentially equal to the amount of fuel being consumed by the engine, and thus, for fuel consumption purposes, is the flow rate of interest.

The unused fuel flows through the second sensor assembly 10' and can return to the fuel supply 301 as shown. It should be appreciated that while the fluid flow system 300 only shows one fuel outlet 304 and two vibrating meters 5, 5', in some embodiments, there will be multiple fuel outlets and therefore, more than two vibrating meters.

As discussed in the '344 application, the flow rate of the fuel exiting the fuel outlet 304 (fluid consumption) is typically much smaller than the flow rate in the supply and return conduits 302, 306, leading to oversized sensor assemblies 10, 10'. It can easily be appreciated that even a small drift in the zero offset of each individual meter can adversely affect the entire system. However, because the difference in the two flow rates is the value of interest, the absolute zero offset of the individual vibrating meters 5, 5' is not needed to correct the measurement. Rather, the initially calibrated zero offset of the first vibrating meter 5 can be used and a differential zero offset, as defined above and explained in greater detail in the '344 application, can be calculated for the second vibrating meter 5'. Although the second vibrating meter 5' is shown downstream of the first vibrating meter 5, the order could be switched while remaining within the scope of the present embodiment. By way of example, the second vibrating meter 5' can be referenced against the first vibrating meter 5. However, the particular meter used as the reference meter is not important. Therefore, in embodiments where the zero offset comprises a differential zero offset, one of the vibrating meters can be considered a reference meter with the zero offset of the other vibrating meter calibrated to match the reference meter. Therefore, the differential zero offset can be calculated using equation (4) above.

While using a differential zero offset has made improvements in differential flow measurements, at times there may still exist small differences that can occur between zeroing operations when the two meters are measuring the same flow. Although the differences are often small, the difference can be significant when totalized over time. For example, if the engine is turned off for long periods of time while fuel is still flowing through the system the totalized differential flow rate between the two flow rates from the first and second meter 5, 5' may accumulate to a serious error. During such a situation, if the second vibrating meter 5' measures a flow rate that is less than the flow rate measured by the first vibrating meter 5, a user or operator may assume there is a leak in the system. Conversely, if the second vibrating meter 5' measures a flow rate that is greater than the flow rate measured by the first vibrating meter 5, the system essentially asserts that the engine is generating fuel, which would clearly not be true.

Figure 4:
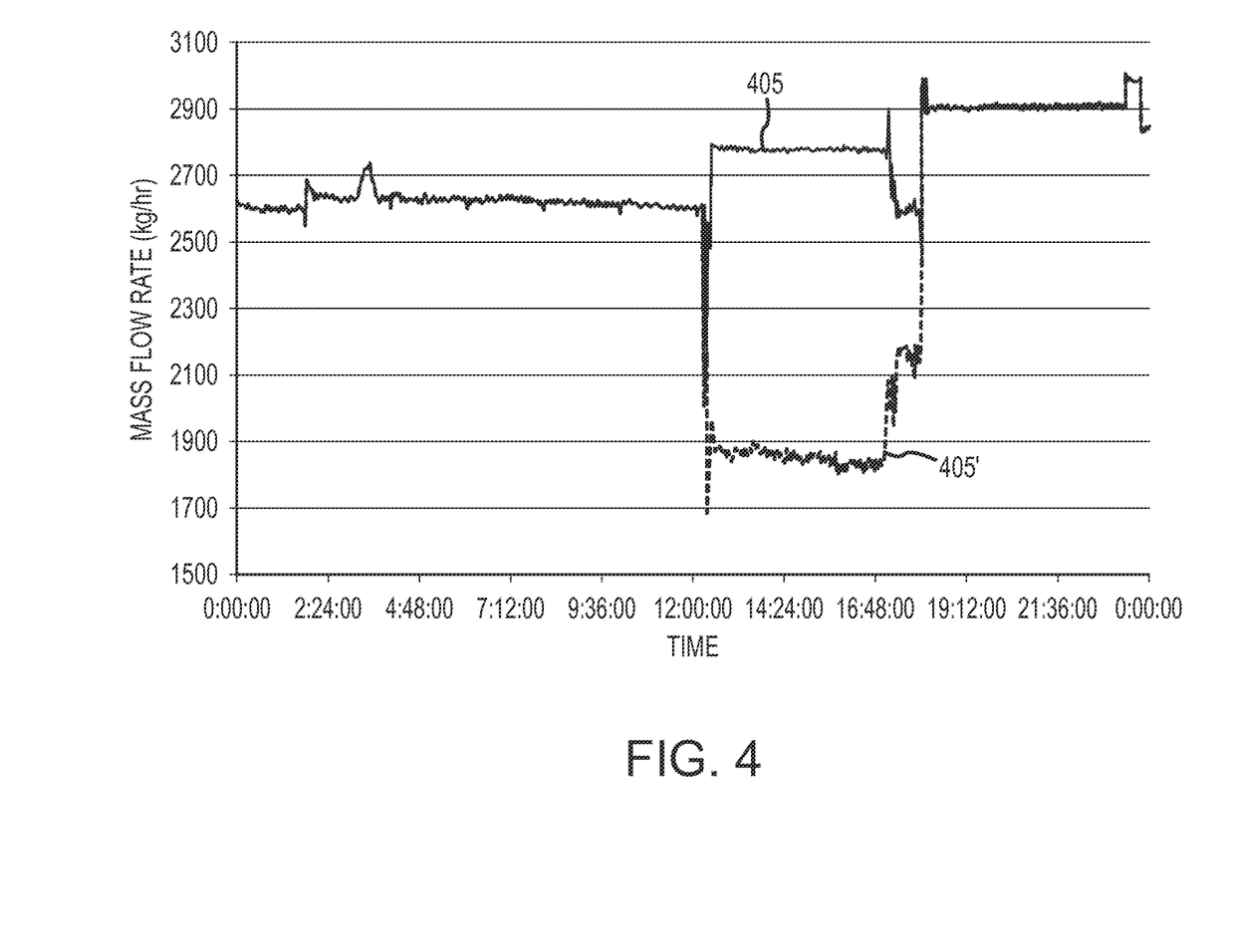
FIG. 4 shows a graph of mass flow rate versus time.

FIG. 4 shows a graph of example flow rate measurements taken from the first and second vibrating meters 5, 5'. Between time zero and approximately, 12:00, the flow rate through the fluid flow system 300 is approximately 2600 kg/hr. However, at approximately 12:00, the engine turns on and fuel begins being consumed by exiting the fuel outlet 304. Consequently, the fuel supplied is slightly increased to approximately 2750 kg/hr to ensure adequate fuel is being supplied to the engine, which is measured by the first vibrating meter 5 and shown on line 405 in FIG. 4. The second vibrating meter 5' however, measures a mass flow rate of approximately 1850 kg/hr as shown by line 405'. Therefore, the meter electronics 20' or the system controller 310 can determine that the difference in flow rates measured by the first and second vibrating meters 5, 5', i.e., a differential flow rate between the first and second vibrating meters 5, 5' is approximately 900 kg/hr. As mentioned above, this differential flow rate is the value of interest in fuel consumption applications.

FIG. 4 also shows that the engine is turned off at approximately 18:00 where the mass flow rates measured by the first and second vibrating meters 5, 5' are substantially equal. According to an embodiment, the meter electronics 20' can ensure that differential flow rates measured while the engine is off and thus, not consuming fuel are corrected. According to an embodiment, the meter electronics 20', for example can compare the determined differential flow rate to a threshold value or band. If the determined differential flow rate is less than the threshold value or band, the system controller 310 or the meter electronics 20' can correct one or more flow characteristics of the fluid flow system 300.

According to an embodiment, the correction can comprise determining that the differential flow rate is zero. According to an embodiment, the differential flow rate can be set to zero by setting the second flow rate determined by the second vibrating meter 5' to equal the first flow rate determined by the first vibrating meter 5. In other words, the meter electronics 20' or the system controller 310 can output a differential flow rate of zero even though the flow rates determined by the first and second vibrating meters 5, 5' are not equal. This is similar to a low flow cutoff value as is known in prior art single meter systems. However, the low flow cutoff value cannot be used in some embodiments of the fluid flow system 300 as each vibrating meter 5, 5' still has a significant fluid flow through the sensor assemblies 10, 10'. Therefore, rather than utilizing a low flow cutoff, the differential flow rate can be compared to a threshold value or band (range of values). The threshold value or band may comprise a differential flow rate below which, the determined differential flow rate is attributable to an error rather than an actual differential flow. The particular values used for the threshold value or band will generally depend upon the particular circumstances of the fluid flow system 300. For example, what a typical differential flow rate value comprises during normal use. Preferably, the threshold value or band will be far enough away from the typical differential flow rate that threshold flow rates determined when the engine is consuming fuel will not be below the threshold value or band.

According to another embodiment, the correction preformed upon determining the differential flow rate is below the threshold value or band can comprise setting the differential flow rate to zero by determining a new differential zero offset. For example, if the differential flow rate is below the threshold value or band, the determined differential flow rate may be attributable to a change in the differential zero offset as determined above. Consequently, the meter electronics 20', for example, can assume that the flow rate through the vibrating meters 5, 5' is substantially equal when the differential flow rate is below the threshold value or band and a new differential zero offset can be determined. According to an embodiment, the new differential zero offset may be determined any time the differential flow rate is below the threshold value or band. Alternatively, the new differential zero offset may be determined any time the differential flow rate is below the threshold value or band for a predetermined amount of time. The new differential zero offset may be determined when the differential flow rate is below a threshold value or band for a predetermined amount of time and the flow rate through the first and second vibrating meters 5, 5' is substantially constant. This can prevent a new differential zero offset from being determined during fluctuating flow. In another alternative embodiment, the new zero offset may be determined if a user initiates a new zeroing routine while the differential flow rate is below the threshold value or band.

According to another embodiment, the correction to the one or more flow characteristics upon determining that the differential flow rate is less than the threshold value or band may comprise a correction to a flow characteristic other than the flow rate. For example, if the differential flow rate is less than the threshold value or band, substantially the same fluid is flowing through both sensor assemblies 10, 10'. Therefore, flow characteristics, such as the density, viscosity, volume flow rate etc. should be substantially equal assuming substantially constant temperatures. Therefore, with the differential flow rate below the threshold value or band, the various flow characteristics determined by the first and second vibrating meters 5, 5' can be compared to each other to ensure the determined characteristics are substantially equal. If they are not equal or within a threshold limit of one another, the meter electronics 20, 20' or the system controller 310 may recalibrate one or both the vibrating meters 5, 5' such that the two vibrating meters are calculating substantially equal values for the various flow characteristics. Alternatively, the correction may comprise reporting an error message if the various flow characteristics do not substantially match to within a threshold limit when the differential flow rate is less than the threshold value or band. Those skilled in the art will readily recognize that temperature can change dramatically inside an engine or other fluid consuming device. Therefore, the density and/or viscosity flowing through the first and second vibrating meters 5, 5' may be different even when the flow rate is substantially the same due to temperature variations in the fluid. Therefore, if the temperature of the fluid is different within the first and second vibrating meters 5, 5', a corresponding correction may be required. For example, if the flow rates are measured as mass flow rates, a volumetric flow rate may be obtained by converting using a density at standard temperature.

In addition to a change in the differential zero offset that can occur over time between the first and second vibrating meters 5, 5', another problem associated with multiple meter systems is a delay that can occur as signals are transmitted between the two or more vibrating meters. For example, as shown in FIG. 3, the first meter electronics 20 is in electrical communication with the second meter electronics 20' via lead 26. Although the lead 26 may comprise a variety of different communication protocols, one particularly popular communication protocol in the flow meter industry is the Hart® protocol. As is generally known in the art, the Hart® protocol often has a delay between the time a signal is sent and the time a signal is received that may affect measurements.

By way of example, according to an embodiment, the second meter electronics 20' may obtain measurement signals from the first meter electronics 20. However, the measurement signals received by the second meter electronics 20' may be delayed from the time the sensor signals were initially received by the first meter electronics 20 from the sensor assembly 10 by a predetermined interval. For example, the second meter electronics 20' may receive measurement signals based on sensor signals taken 0.5 seconds previously from the sensor assembly 10. The delay may be due to a processing delay or a sampling delay. Upon receiving the measurement signals, the second meter electronics 20' can then compare the first flow rate obtained from the first vibrating meter 5 to the second flow rate determined based on sensor signals received from the second sensor assembly 10' to determine a differential flow rate. As long as the flow rate remains substantially constant during this sampling time, an acceptable differential flow rate can be determined. However, if the flow rate changes between the sampling times, the sensor signals from the second sensor assembly 10' will be compared to the wrong flow rate received from the first vibrating meter 5, i.e., the second meter electronics 20' will be comparing measurements obtained based on two different flow rates taken at different times. This problem is illustrated in FIG. 5.

Figure 5:
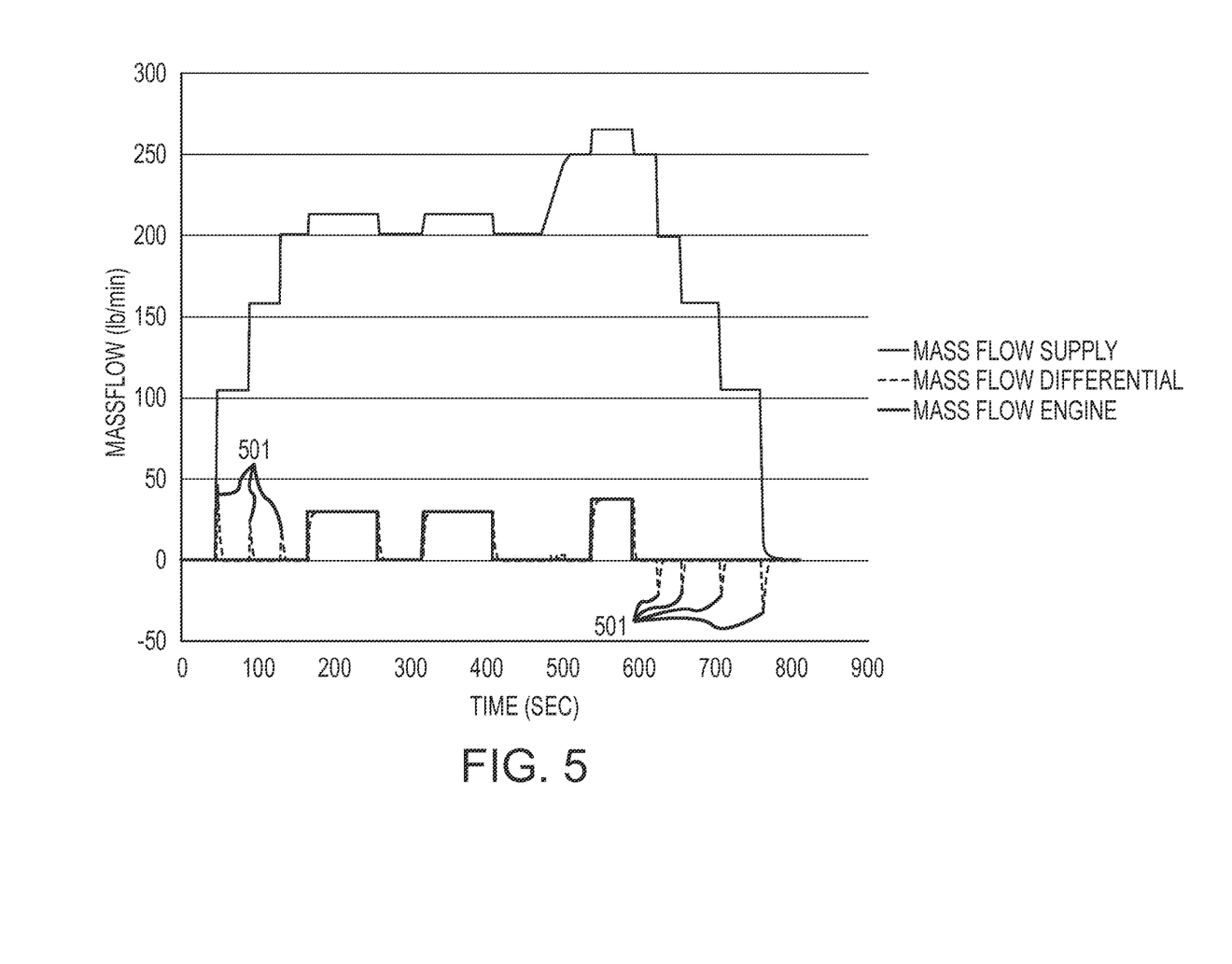
FIG. 5 shows a graph of mass flow rate versus time with varying supply flow rates.

FIG. 5 shows a graph of mass flow versus time. As can be seen, the mass flow supplied from the fuel supply 301 is varied over time. Additionally, the mass flow to the engine varies, for example, due to the engine turning on and off. As the fuel consumption varies, the measured differential flow rate as determined based on the first and second measured flow rates from the first and second vibrating meters 5, 5' also changes. However, in addition to the changes in the differential flow rate due to a change in the fuel consumption, the graph shows various momentary spikes 501 in the determined differential flow rate as the fuel supply varies. The spikes occur without changes to the fuel consumption rate. The spikes 501 in the determined differential flow rate are due to the processing delay that occurs as the supply flow rate changes abruptly between sampling times. This causes the differential flow rate to be determined using sensor signals taken at different times. In order to overcome the processing delay, a delay can be added to the sensor signals from the second sensor assembly 10'. The so called "group delay" can be added to better match the time that the sensor signals were received from the first sensor assembly 10 to the time the sensor signals were received from the second sensor assembly 10' even though the measurement signals are received from the first meter electronics 20 at a later point in time.

Figure 6:
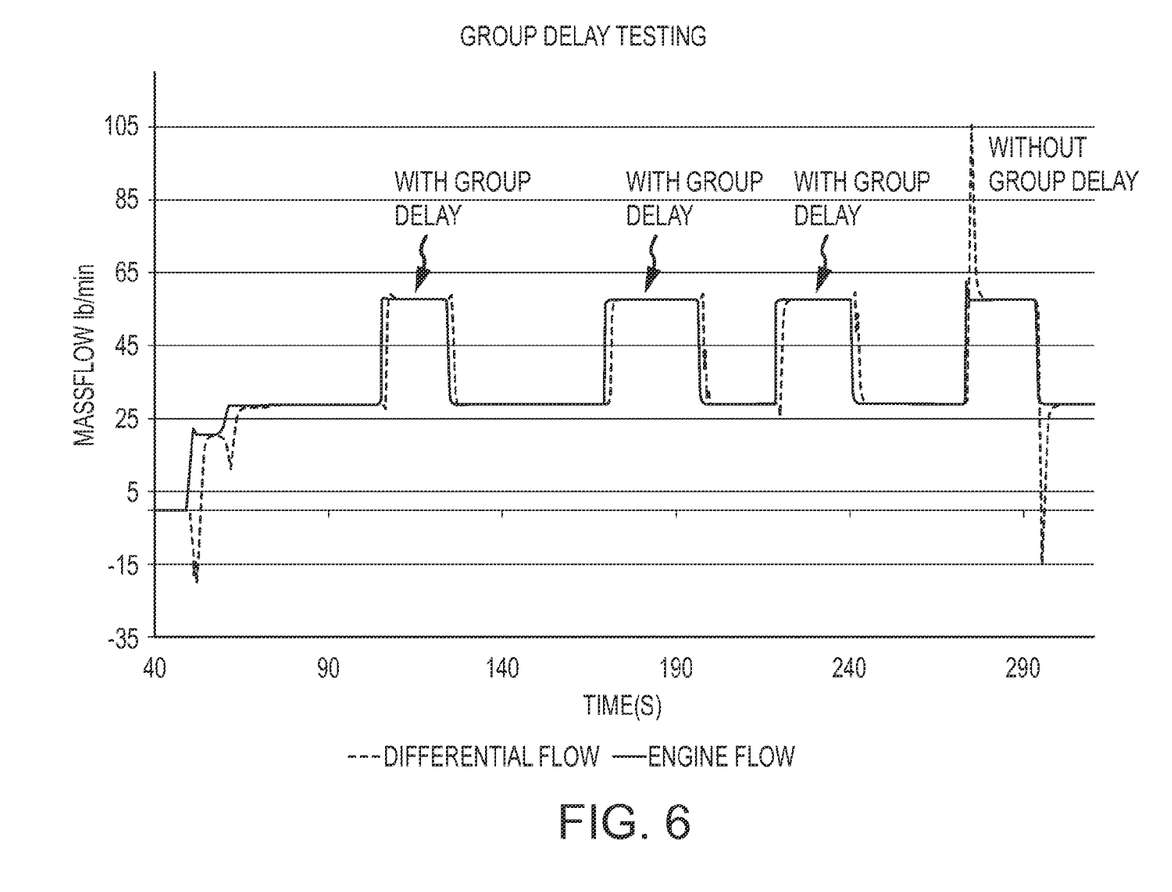
FIG. 6 shows a graph of differential flow rate and engine consumption with various group delays.

FIG. 6 shows a graph of mass flow rate versus time with various group delays applied to the sensor signals received from the second sensor assembly 10'. The engine consumption as determined by a separate flow meter (not shown) is compared to the differential flow rate as determined based on the sensor signals received from the first and second sensor assemblies 10, 10'. As shown in the far right, when no group delay is applied to the measurement, large spikes in the determined differential flow rate are seen when the engine consumption rapidly increases or decreases. In contrast, when a group delay is applied to the sensor signals from the second sensor assembly 10', the spikes are drastically reduced thereby improving the determined differential flow rate. For the Hart® protocol, the group delay is approximately 650-700 ms; however, the particular group delay applied to the sensor signals can vary from one application to another. Therefore, the particular values illustrated should in no way limit the scope of the present embodiment.

The present embodiment implements a group delay applied to the sensor signals received from the second sensor assembly 10' due to the processing delay caused by transmitting the measurement signals from the first meter electronics 20 to the second meter electronics 20'. A group delay may likewise be applied to the sensor signals received from the first sensor assembly 10. It should be appreciated that the particular group delay required may depend upon the particular communication protocol used. Furthermore, a group delay may also be required in embodiments where a single meter electronics receives sensor signals from both sensor assemblies 10, 10'. Additionally, those skilled in the art can readily recognize that a group delay may also be required in embodiments where measurement signals are transmitted from the first and second meter electronics 20, 20' to the system controller 310 for further processing; for example, in embodiments where the system controller 310 performs the differential flow calculation.

Figure 7:
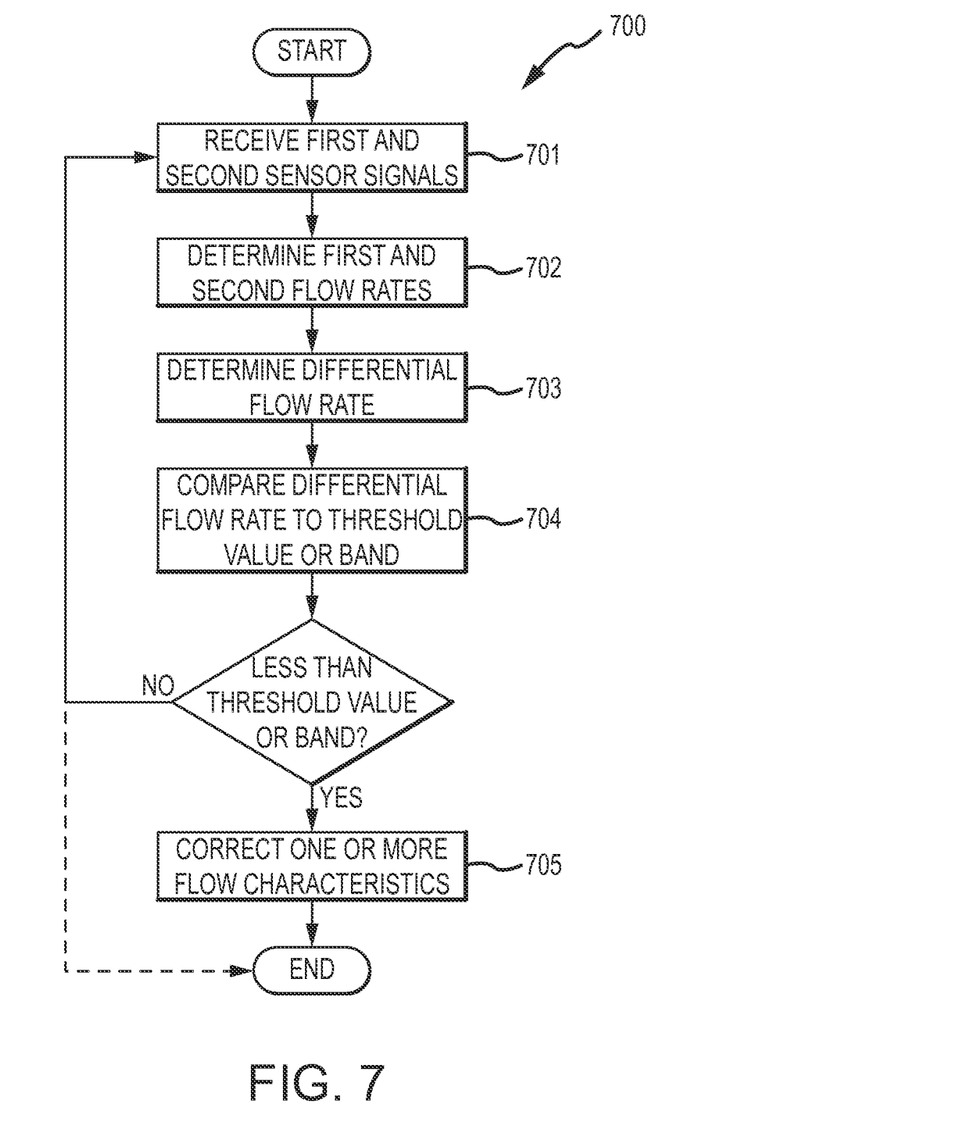
FIG. 7 shows a processing routine according to an embodiment.

FIG. 7 shows a processing routine 700 according to an embodiment. The processing routine 700 may be stored in and performed by one of the meter electronics 20 or 20', for example. Alternatively, the processing routine 700 may be stored in and performed by the system controller 310. The processing routine 700 can be used to prevent false differential flow rates from being reported and totalized. The processing routine 700 can also be used to update the differential zero offset of the calibrated vibrating sensor.

The processing routine starts in step 701 where first sensor signals are received from the first sensor assembly 10 and second sensor signals are received from the second sensor assembly 10'.

In step 702, first and second flow characteristics are determined based on the first and second sensor signals. According to an embodiment, the first and second flow characteristics may comprise first and second flow rates. According to an embodiment, one of the first or second flow rates can be determined using the differential zero offset as discussed above. The first and second flow rates may comprise mass flow rates. Alternatively, the first and second flow rates may comprise volumetric flow rates.

In step 703, a differential flow rate is determined based on the first and second flow characteristics. According to an embodiment, the differential flow rate can be determined using the group delay applied to the second flow rate such that the differential flow rate is determined using first and second flow rates taken at substantially the same time.

In step 704, the differential flow rate is compared to a threshold value or band. The threshold value or band may be predetermined by a manufacturer. Alternatively, the threshold value or hand can be user selected, for example, if the differential flow rate is less than the threshold value or band, the meter electronics 20' can correct one or more flow characteristics of the first or second vibrating meter 5, 5' in step 705, As discussed above, the differential flow rate may fall below the threshold value or hand for a variety of reasons. In the fuel consumption application discussed above, the differential flow rate may fall below the threshold value or band upon turning off the engine.

As discussed above, the correction may comprise outputting a differential flow rate of zero. According to another embodiment, the correction can comprise calculating a new differential zero offset. The new differential zero offset may be calculated so as to create substantially equal first and second flow rates. The new differential zero offset may then be used for subsequent measurements. The correction may also comprise outputting an error message or correcting other flow characteristics such as a determined density, or temperature, for example. If the differential flow rate is not less than the threshold value or band, the processing routine can either return to step 701 or end.

The embodiments described above provide an apparatus and method for correcting one or more flow characteristics of a fluid flow system that utilizes multiple vibrating meters. The embodiments provide a method for preventing false differential flow rates from being totalized and/or reported as actual flow. Rather, if the differential flow rate as determined by two or more vibrating meters is below a threshold value or band, the differential flow rate can be set to zero. The differential flow rate can simply be set to zero and output, or a new differential zero offset can be calculated such that the first and second flow rates are equal, thereby effectively setting the differential flow rate to zero. Additionally, the embodiments described above can account for a delay due to signal processing or signal sampling that may affect the differential flow rate if the flow rate through the system is changing.

The detailed descriptions of the above embodiments are not exhaustive descriptions of all embodiments contemplated by the inventors to be within the scope of the present description. Indeed, persons skilled in the art will recognize that certain elements of the above-described embodiments may variously be combined or eliminated to create further embodiments, and such further embodiments fall within the scope and teachings of the present description. It will also be apparent to those of ordinary skill in the art that the above-described embodiments may be combined in whole or in part to create additional embodiments within the scope and teachings of the present description.

Thus, although specific embodiments of, and examples for, the fluid flow system are described herein for illustrative purposes, various equivalent modifications are possible within the scope of the present description, as those skilled in the relevant art will recognize. The teachings provided herein can be applied to other flow systems, and not just to the embodiments described above and shown in the accompanying figures. Accordingly, the scope of the invention should be determined from the following claims.

We claim:

1. A fluid flow system (300), comprising:
a pipeline (302) with a flowing fluid;
a first vibrating meter (5) including a first sensor assembly (10) located within the pipeline (302) and configured to determine one or more flow characteristics, including a first flow rate;
a second vibrating meter (5') including a second sensor assembly (10') located within the pipeline (302) and in fluid communication with the first sensor assembly (10) and configured to determine one or more flow characteristics, including a second flow rate;
a system controller (310) in electrical communication with the first and second vibrating meters (5, 5') and configured to:
receive the first and second flow rates;
determine a differential flow rate based on the first and second flow rates;
compare the differential flow rate to a threshold value or band; and
correct one or more flow characteristics if the differential flow rate is less than a threshold value or band.

2. The fluid flow system (300) of claim 1, wherein the correction comprises setting the differential flow rate to zero.

3. The fluid flow system (300) of claim 1, wherein one of the first or second flow rates is determined using a differential zero offset.

4. The fluid flow system (300) of claim 3, wherein the system controller (310) is further configured to determine a new differential zero offset if the differential flow rate is less than the threshold value.

5. The fluid flow system (300) of claim 3, wherein the system controller (310) is further configured to determine a new differential zero offset if the differential flow rate is less than the threshold value for a predetermined amount of time.

6. The fluid flow system (300) of claim 1, wherein the system controller (310) is further configured to apply a group delay to one of the first or second flow rates such that the first and second flow rates are representative of flow rates occurring at substantially the same time.

7. A meter electronics (20') for a first sensor assembly (10') located within a pipeline (302) and in fluid communication with a second sensor assembly (10) of a vibrating meter (5) in electrical communication with the meter electronics (20'), configured to:
receive sensor signals from the first sensor assembly (10') and determine one or more flow characteristics, including a first fluid flow rate;
receive a second fluid flow rate from the second vibrating meter (5);
determine a differential flow rate based on the first and second fluid flow rates;
compare the differential flow rate to a threshold value or band; and
correct one or more flow characteristics if the differential flow rate is less than the threshold value or band.

8. The meter electronics (20') of claim 7, wherein the correction comprises setting the differential flow rate to zero.

9. The meter electronics (20') of claim 7, further configured to determine the first fluid flow rate using a differential zero offset.

10. The meter electronics (20') of claim 9, further configured to determine a new differential zero offset if the differential flow rate is less than the threshold value or band.

11. The meter electronics (20') of claim 9, further configured to determine a new differential zero offset if the differential flow rate is less than the threshold value or band for a predetermined amount of time.

12. The meter electronics (20') of claim 7, further configured to determine the differential flow rate using a group delay applied to the first flow rate such that the first and second flow rates are representative of flow rates occurring at substantially the same time.

13. A method of operating a fluid flow system including a first vibrating meter and a second vibrating meter in fluid communication with the first vibrating meter, comprising steps of:
- receiving first sensor signals from the first vibrating meter and receiving second sensor signals from the second vibrating meter;
- determining one or more flow characteristics, including first and second flow rates based on the first and second sensor signals;
- determining a differential flow rate based on the first and second flow rates;
- comparing the differential flow rate to a threshold value or band; and
- correcting the one or more flow characteristics if the differential flow rate is less than the threshold value or band.

14. The method of claim 13, wherein the correction comprises setting the differential flow rate to zero.

15. The method of claim 13, wherein one of the first or second flow rates is determined using a differential zero offset.

16. The method of claim 15, further comprising a step of determining a new differential zero offset if the differential flow rate is less than the threshold value or band.

17. The method of claim 15, further comprising a step of determining a new differential zero offset if the differential flow rate is less than the threshold value or band for a predetermined amount of time.

18. The method of claim 13, wherein the step of determining the differential flow rate comprises applying a group delay to one of the first or second flow rates such that the first and second flow rates are representative of flow rates occurring at substantially the same time.

* * * * *